US010405054B2

(12) United States Patent
Okamura et al.

(10) Patent No.: US 10,405,054 B2
(45) Date of Patent: Sep. 3, 2019

(54) SYSTEM AND METHOD OF REMOTELY DETERMINING QOE

(71) Applicant: CHARTER COMMUNICATIONS OPERATING, LLC, St. Louis, MO (US)

(72) Inventors: Michael Okamura, Denver, CO (US); Anirudh Maheshwari, Englewood, CO (US); Naveenreddy Byreddy, Denver, CO (US); Betson Thomas, New Hyde Park, NY (US); Gregory Wysocki, Copiague, NY (US)

(73) Assignees: NUOVO SOLUTIONS LLC, Woodbury, NY (US); CHARTER COMMUNICATIONS OPERATING, LLC, St. Louis, MO (US)

( * ) Notice: Subject to any disclaimer, the term of this patent is extended or adjusted under 35 U.S.C. 154(b) by 2 days.

(21) Appl. No.: 15/239,238

(22) Filed: Aug. 17, 2016

(65) Prior Publication Data

US 2018/0054656 A1    Feb. 22, 2018

(51) Int. Cl.
| | | |
|---|---|---|
| H04N 7/16 | (2011.01) | |
| H04N 21/647 | (2011.01) | |
| H04N 21/24 | (2011.01) | |
| H04N 21/4402 | (2011.01) | |

(52) U.S. Cl.
CPC ....... *H04N 21/64738* (2013.01); *H04N 21/24* (2013.01); *H04N 21/4402* (2013.01)

(58) Field of Classification Search
CPC ......... H04N 21/44222; H04N 21/2543; H04N 21/4532; H04N 21/812; H04N 21/6582; H04N 21/4622; H04N 21/17318; H04N 21/4782; H04N 21/8586; H04N 21/4788
USPC .......... 725/9, 91–93, 109–116; 709/217–232
See application file for complete search history.

(56) References Cited

U.S. PATENT DOCUMENTS

| | | | | |
|---|---|---|---|---|
| 5,818,441 A * | 10/1998 | Throckmorton | ...... | G06F 1/1626 715/717 |
| 7,058,721 B1 * | 6/2006 | Ellison | ................ | G11B 27/031 348/E5.008 |
| 7,810,123 B1 * | 10/2010 | Prestoy | ............. | H04N 7/17354 709/212 |
| 8,996,547 B2 * | 3/2015 | Bocharov | ......... | H04L 29/06027 707/706 |
| 9,219,790 B1 * | 12/2015 | Filev | ...................... | H04L 67/22 |
| 9,491,523 B2 * | 11/2016 | Margulis | ............. | H04L 12/2838 |
| 9,535,559 B2 * | 1/2017 | Poornachandran | ..... | G06F 3/048 |
| 2001/0003823 A1 * | 6/2001 | Mighdoll | ............ | G06F 3/04892 709/200 |
| 2002/0056123 A1 * | 5/2002 | Liwerant | ............... | H04M 3/567 725/87 |

(Continued)

*Primary Examiner* — Annan Q Shang
(74) *Attorney, Agent, or Firm* — Meagher Emanuel Laks Goldberg & Liao, LLP

(57) ABSTRACT

Systems, methods, architectures, mechanisms or apparatus of monitoring Quality of Experience (QoE) of a device under test (DUT) configured to generate an image-bearing presentation signal comprising converting the presentation signal into a data stream configured to enable QoS processing of the presentation imagery by a QoS assessment device; permitting the device to perform local, real-time testing and verification; and forwarding the data stream toward a remote QoE assessment device.

22 Claims, 9 Drawing Sheets

(56) References Cited

U.S. PATENT DOCUMENTS

| | | | |
|---|---|---|---|
| 2003/0030750 A1* | 2/2003 | Hoarty | H04L 63/04 348/461 |
| 2005/0188086 A1* | 8/2005 | Mighdoll | G06F 8/65 709/225 |
| 2007/0124778 A1* | 5/2007 | Bennett | H04N 5/4403 725/81 |
| 2010/0064324 A1* | 3/2010 | Jenkin | H04N 21/443 725/59 |
| 2010/0132001 A1* | 5/2010 | Kitano | H04N 5/775 725/118 |
| 2010/0166068 A1* | 7/2010 | Perlman | A63F 13/86 375/240.12 |
| 2010/0315553 A1* | 12/2010 | Takatsuji | G06F 21/10 348/516 |
| 2012/0144445 A1* | 6/2012 | Bonta | H04L 12/1868 725/116 |
| 2012/0265892 A1* | 10/2012 | Ma | H04N 21/23418 709/231 |
| 2013/0336132 A1* | 12/2013 | Shaw | H04W 72/08 370/252 |
| 2014/0165085 A1* | 6/2014 | Karacali-Akyamac | H04N 21/23418 725/14 |
| 2014/0165103 A1* | 6/2014 | Lejeune | H04L 12/2814 725/39 |
| 2014/0237535 A1* | 8/2014 | Johnston | H04N 7/17318 725/116 |
| 2014/0337870 A1* | 11/2014 | Dey | H04N 21/41407 725/14 |
| 2015/0234564 A1* | 8/2015 | Snibbe | G06F 3/0488 715/716 |
| 2015/0249848 A1* | 9/2015 | Holman | H04N 21/23439 348/469 |
| 2015/0319205 A1* | 11/2015 | Fan | H04L 65/605 709/219 |
| 2016/0127767 A1* | 5/2016 | Xu | H04N 21/4126 725/12 |

* cited by examiner

SYSTEM AND METHOD OF REMOTELY DETERMINING QOE

FIELD OF THE INVENTION

The invention relates to the delivery of customer support within an information distribution system and, more particularly but not exclusively, to determining a Quality of Experience (QoE) level associated with customer premise equipment (CPE) of subscribers receiving services via a television distribution system.

BACKGROUND

Cable television service providers, satellite television service providers and other television or content distribution companies offer numerous broadcast channels as well as on-demand content to subscribers via set top boxes (STBs) and other customer premise equipment (CPE). A subscriber interacts with an Electronic Program Guide (EPG) or other User Interface (UI) provided via the STB to select broadcast channels, on-demand content and so on for viewing, for performing various administrative functions and so on.

Subscribers may experience problems with their CPE or services delivered thereby such that remote or in person technical support is required. Such support is costly in terms of service provider costs such as telephone or in person service calls, as well as subscriber costs such as reduced satisfaction.

SUMMARY

Various deficiencies in the prior art are addressed by systems, methods, architectures, mechanisms or apparatus for monitoring Quality of Experience (QoE) of a device under test (DUT) configured to generate an image-bearing presentation signal comprising converting the presentation signal into a data stream configured to enable QoS processing of the presentation imagery by a QoS assessment device; and forwarding the data stream toward a remote QoE assessment device.

For example, a method according to one embodiment comprises propagating toward customer premises equipment (CPE) remote device control commands (RDCCs) for configuring the CPE in accordance with a desired test and for configuring the CPE to transmit a CPE generated video stream toward the test platform; and evaluating the CPE generated video stream to determine therefrom at least one quality of experience (QoE) parameter. The method may be applied, for example, to each of a plurality of CPE associated with one of a hub, head end and geographic region.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

While the various embodiments will primarily be described within the context of particular content delivery system topology (e.g., a television distribution system), it will be appreciated that the various embodiments are more generally useful within any system that outputs video and are especially well suited for testing points of interest distributed over a wide geographic area. For example, the embodiments described herein may be used to evaluate a ".net" platform experience as perceived by a customer. This mechanism for determining a "behind home modem" experience of a customer is something unique and avoids the limits of simulation using specialized accounts that are whitelisted to appear as if they are behind the home modem. Various test scenarios may be invoked via mobile app for behind home modem and outside the home testing. On both platforms, video is made available as part of the behind home modem experience to provide QoE evaluation of the customer/subscriber/user experience.

Figure 1:
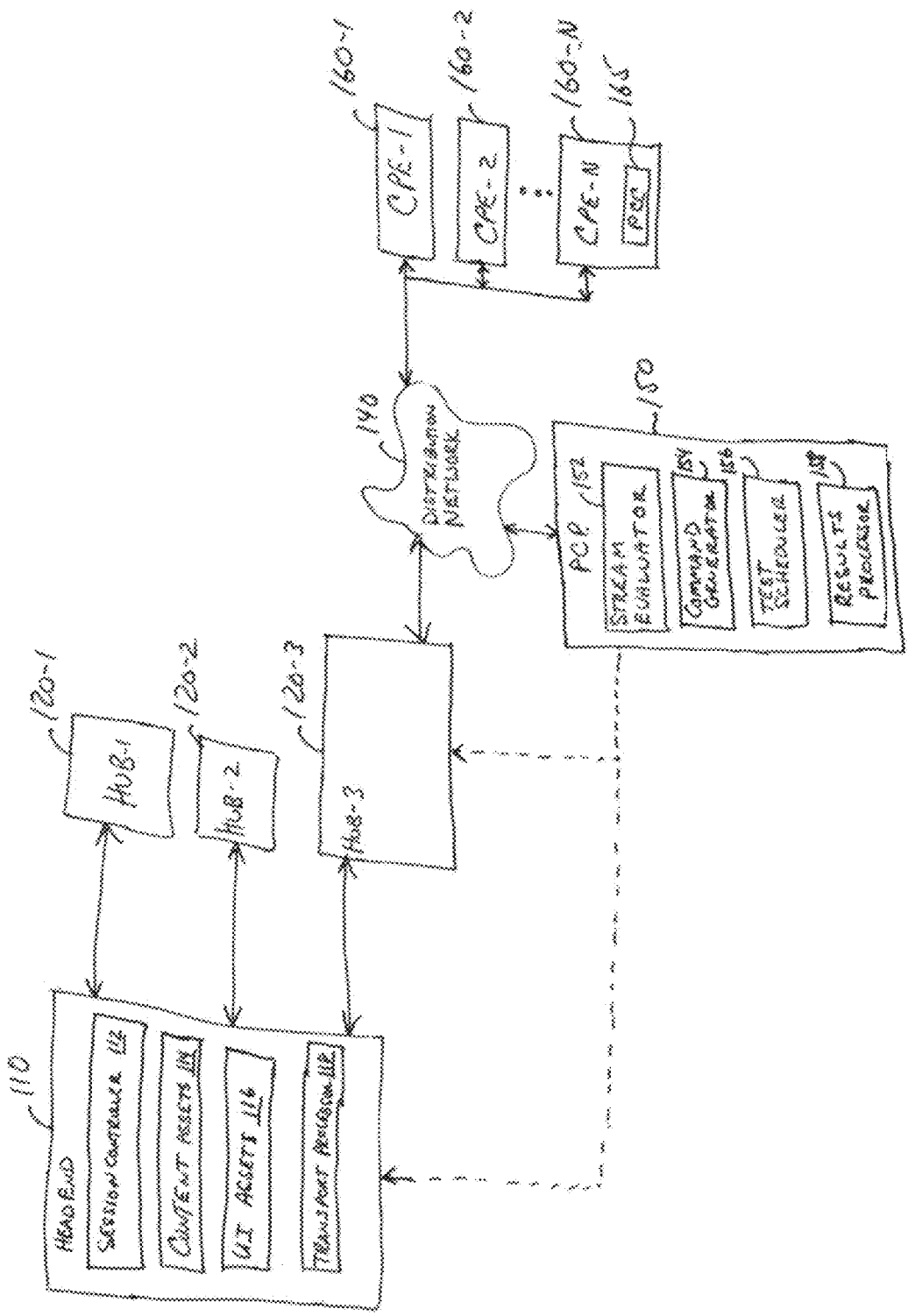
FIG. 1 depicts a high-level block diagram of a content delivery system benefiting from various embodiments.

FIG. 1 depicts a high-level block diagram of a content delivery system benefiting from various embodiments. Specifically, FIG. 1 depicts a content delivery system 100 comprising a head end 110 in communication with each a plurality of hubs 120 (illustratively three hubs denoted as 120-1 through 120-3), each communicating with a respective group of customer premises equipment (CPE) via a distribution network 140. Also depicted in FIG. 1 is a Performance Capture Platform (PCP) 150 capable of communicating with CPE 160 via distribution network 140.

In various embodiments, each hub 120 communicates with its respective CPE group 160 via a respective distribution network 140. In various embodiments, the distribution network 140 supports communications between multiple hubs 120 and CPE groups 160. In various embodiments, communications between head end 110 and one or more CPE groups 160 may be direct (i.e., without using a hub 120).

The distribution network 140 may comprise one or more of a Hybrid Fiber Coax (HFC) for cable, optical network, IP network, Plain Old Telephone System (POTS) or digital subscriber line (DSL), terrestrial broadcast system like Multichannel Multipoint Distribution Service (MMDS) or Local Multipoint Distribution Service (LMDS), or satellite distribution system like Direct broadcast satellite (DBS). In various embodiments the distribution network 140 may comprise an IP network that may include more than one access network, may traverse core Internet networks, may traverse third-party networks and so on.

The head end 110 comprises, illustratively, a session controller 112, content asset module 114, user interface (UI) asset module 116 and a transport processor 118. Various other elements normally associated with a head end 110 are omitted for simplicity.

The session controller (or session manager) 112 generally operates to interact with CPE 160 to authenticate CPE to the service provider, establish a session between the head end and each CPE, determine subscriber authorization with respect to receiving content, content channels, network services and/or other provider supplied services at subscriber CPE, and cause the delivery of authorized services to subscriber CPE as appropriate. The session controller provides session control of the information flowing to and from content asset module 114 and UI asset module 116. The session controller 112 provider controls communications between service provider equipment such as head end 110, hub 120, PCP 150 and/or other service provider equipment or third-party equipment.

Content asset module 114 stores content assets such as those associated with content to be broadcast or streamed to CPE, downloaded by CPE or otherwise delivered to CPE, such as video assets, audio assets, metadata, Digital rights management (DRM) information, encryption information and so on. Content assets 140 may comprise assets stored at or proximate head end 110, or assets received via head end 110 from a remote source (not shown). Content may comprise movies, television programs and other information offerings User interface (UI) asset module 116 stores UI assets such as those associated with electronic program guide (EPG) or other UI imagery and/or functionality invoked at subscriber CPE to enable subscriber interaction such as content selection, viewing/setting subscriber account parameters and so on.

Transport processor 118 combines or multiplexes content and/or UI asset data as needed to provide an output data stream for transmission to subscriber CPE via the distribution network 140. In various embodiments, the transport processor 118 performs transport packetizing functions for content and/or UI asset data as needed in conformance with the appropriate transport protocols associated with distribution network 140 and/or transport channels formed therethrough. In various embodiments, the transport processor 118 performs video encoding functions such as MPEG encoding or transcoding of content or UI assets.

As depicted herein, session controller 112 sends data, such as commands, encryption keys and the like to subscriber CPE 160 via the distribution network 140. Session controller 112 receives subscriber equipment data, such as information stream requests, session initiation data (set-top identification, capability, and the like), user clickstream information and/or other data from subscriber CPE 160 via the distribution network 140.

The distribution network 140 may comprise any one of a number of conventional broadband communications networks such as a fiber optic network, a telecommunications network, a cable television network and the like. In various embodiments, distinct a high bandwidth forward application transport channel (FATC) is used to transport content and in-band signaling information from the head end 110 (and/or hub 120) to the subscriber CPE 160. In various embodiments, a forward data channel (FDC) and/or reverse data channel (RDC) may be used to transport out-of-band signaling information between the head end 110 (and/or hub 120) and subscriber CPE 160.

The Performance Capture Platform (PCP) 150 is operable to interact with subscriber CPE 160 or portions thereof to evaluate operational parameters and/or delivered subscriber Quality of Experience (QoE). Various embodiments are directed toward enabling and/or causing subscriber CPE to provide information relevant in such evaluations, such as via a Performance Capture Clients (PCC) 165 within subscriber CPE 160, as depicted in FIG. 1.

Operational parameters associated with CPE 160 include parameters such CPE reported operational state, as CPE determined operational state and/or function and CPE reported service delivery state and/or function. A partial list of these parameters include power on/off status, processing mode, selected/active input port, selected/active output port, active input data type and/or format, active output data type and/or format, CPE diagnostic status indicators and so on.

Delivered subscriber Quality of Experience (QoE) comprises that which positively or negatively affects the experience of the subscriber when using subscriber CPE or the various services delivered thereby. A partial list of this includes presentation image quality, presentation sound quality, voice/data QoS parameters (e.g., lag, jitter, packet loss and the like), user interface presentation errors, user interface data/information errors and so on.

In various embodiments, PCP 150 comprises a number of modules adapted to implement the various functions described herein. For example, PCP 150 is depicted as comprising a stream evaluator 152, a command generator 154, a test scheduler 156 and a results processor 158.

The stream evaluator 152 is used in various embodiments to receive and evaluate a video, audio, audiovisual and/or data stream transmitted via subscriber CPE 160, such as a Real-Time Messaging Protocol (RTMP) stream from a subscriber's set top box (STB) representative of the presentation signal produced by that STB (e.g., HDMI output, VGA output, component output and the like). In this manner, an evaluation of the presentation imagery and/or sound associated with that signal to derive thereby an indication of the likely QoE associated with the presentation signal.

The command generator 154 is used in various embodiments to generate the various commands configured to cause subscriber CPE 160 to transmit information indicative of an operational parameter or delivered QoE of interest. In various embodiments, the command generator 154 provides control information suitable for processing by "typical"

subscriber CPE such as a cable modem, set-top box, router and the like. In various embodiments, the command generator 154 provides control information suitable for processing "enhanced" subscriber CPE 160 such as the PCC 165 or other special purpose device included with the subscriber CPE 160.

The test scheduler 156 is used in various embodiments to schedule testing of CPE 160 or portions thereof associated with specific subscribers. For example, in response to a network issue or as a general quality assurance program, subscriber CPE 160 within an entire system or within a geographic region may be periodically evaluated to ensure appropriate function. In addition to geographic factors, schedule tests of subscriber CPE 160 or portions thereof may be based upon types of services delivered, types of equipment used (e.g., different types of STB's, routers, modems and the like), subscriber service level agreements, high-priority subscribers or customers, new subscribers versus all subscribers and so on.

The results processor 158 is used in various embodiments to process the results of various tests. For example, results processor 158 may be used to examine received information indicative of an operational parameter or delivered QoE of interest for a particular subscriber, a group of subscribers at a particular location, a group of subscribers having trouble with a particular service, a group of subscribers entitled to enhanced QoE policing and so on. Further, results processor 158 may perform various statistical processing functions to identify system and/or network issues, such as congestion issues and the like. Further, results processor 158 may perform various statistical processing functions to identify system and/or network opportunities, such as identifying underutilized portions of the system or network such that infrastructure improvements and/or provider equipment deployments may be matched more closely to subscriber needs.

The various PCP modules are implemented within the context of PCP 150, which may be invoked or implemented within a server at the neighborhood level, hub level, head end level or some other level within a service delivery system. Further, the PCP 150 may be invoked or implemented within the context of a virtualized system, such as via a data center.

Performance Capture Platform (PCP) 150

Referring to FIG. 1, PCP 150 is depicted as an entity in communication with subscriber CPE 160 via the distribution network 140. In various embodiments the PCP 150 may communicate with subscriber CPE 160 via the distribution network 140, and/or a hub 120, and/or head end 110. PCP 150 may communicate with subscriber CPE 160 within the context of sessions established by session controller 112 of head end 110.

In various embodiments, the PCP 150 comprises a robust, enterprise grade, scalable, cloud-controlled platform enabling geographically distributed, remote testing of the true end user experience without limit to the geographic coverage area. For example, by accepting an Internet Protocol (IP) video feed from a remote end user device (subscriber CPE 160) and/or delivering control commands to operate that device, the PCP 150 is able to perform tests on the remote device as if it were connected physically.

The PCP may establish a set of automated tests that are scheduled across these devices, on a manual or automated continuous basis, enabling us to ascertain the health and performance of the user experience from a regionalized and global perspective. The PCP may establish these automated tests through internal analysis.

The PCP may be designed and architected to integrate with any end user testing platform. That is, the PCP optionally receives and utilizes data and alerts from complimentary systems creating thereby an ecosystem for geo-localized verification and supporting data to enable better decisions on the operational health of the system, and improve the accuracy and delivery of critical data to various operational systems and groups.

The PCP may support a unified control layer permitting the remote control of distinct devices without device specific knowledge for the user of the platform.

The PCP may be configured to support various use cases, including:

Verification that the intended lineup is the delivered lineup to the remote device;

Verification of real-time modifications of the lineup and modifications in service delivery;

Verification of contractual obligations of service delivery such as blackouts, alternate content, logo modification, channel rebranding Verification of provisioning systems and processes; and Verification that the level of service is maintained once provisioned.

The PCP 150 structure yields the capacity to retrieve data from the remote device (e.g., PCC 165) that is typically only available at the remote device through local access.

The system architecture and data flow process is specifically designed such that it can operate to maximize the efficient resource use of the remote device as well as the testing systems that are integrated such that cost and time are fully utilized. Decoupling of the physical access requirement to perform remote testing of the end user device allows significant gains in utilization and cost effectiveness.

The PCP 150 can automatically manage and identify the remote devices using complementary data systems to reduce and potentially eliminate manual maintenance and record keeping.

The PCP 150 can establish automated tests through internal analysis and has also been designed and architected to integrate with any end user testing platform. Additionally, while the system can leverage existing test automation tools and services, it's structure yields the ability to perform custom test execution and analysis as needed, without the need for a third party system.

The PCP 150 as a cloud platform is uniquely capable of validating use cases that require multiple concurrent devices, such as:

Verification of the identical video content delivery such as between full screen live broadcast/content channel video and corresponding video tiles within an electronic program guide or user interface screen (e.g., does EPG video tile for channel "X" display the same video stream as currently provided via channel "X");

Verification of the disparate video content delivery between local commercials in full screen live TV view of the remote device while national commercials are aired in vid-grid tile video (e.g., does EPG video tile for channel "X" display correct/targeted advertisement video stream while national advertisement provided via channel "X");

Verification of the STB front panel display against user settings;

Verification of mobile device control of STBs; and

Assessment of synchronized, optionally geographically dispersed, performance metrics of remote devices that are individually distinct or otherwise, i.e.:

Verify the channel tune performance of all Roku device variations at a given time across all hubs in a particular head-end;

Verify the local delivery of regional commercials is accurate against the intended commercials for that region; and Verify concurrent national commercial delivery.

The overall platform communication path and structure may be optimized to minimize latency such that a true end user experience is possible for remote users, for functional and performance testing.

Performance Capture Client (PCC) 165

In one embodiment, PCC 165 comprises one or more individualized, distributed hardware units for enterprise grade, remote control, testing, and monitoring such as provided in an easy to use, plug and play hardware device uniquely suited for the media industry environment.

Generally speaking, PCC 165 comprises any one or more of members in a collection of hardware components packaged together and capable of, illustratively, publishing or streaming an IP video stream with original stream formatting (optionally transcoded) associated with one or more end user devices of subscriber CPE 160. The one or more end user devices associated with PCC 165 may be packaged with, included within or added to subscriber CPE 160.

The PCC 165 accepts control commands to operate one or all of the end user devices or the other complementary hardware components associated with subscriber CPE 160 such as to for local or remote control, providing automated self-troubleshooting/health-checks and automated self-healing which allows for complex, video and non-video specific end-user device testing.

Generally speaking, the PCC 165 is configured to be distributed to multiple locations of subscriber CPE 160 to thereby allow insight into a very localized region given a wide effective geographic area. Variations of PCC 165 may be deployed to individual customer sites for non-invasive insight into highly specific issues, which are difficult to pinpoint otherwise.

In various embodiments, the PCC 165 is API-driven for generic integration to various platforms and use cases, such as the following:

Authenticated access, custom or enterprise;

Abstraction of individual component implementations allowing a diverse, non-uniform set of devices to be accessed consistently/uniformly, thereby allowing distinct use cases to be fulfilled with the same overall device structure that is expandable in nature;

Ability to verify the performance at various levels of the end-user device(s) that is associated with the unit using various custom or standard industry tools; and Ability to use the end-user device to verify the behavior and performance of complementary devices and its service delivery (and/or the reverse).

Figure 2:
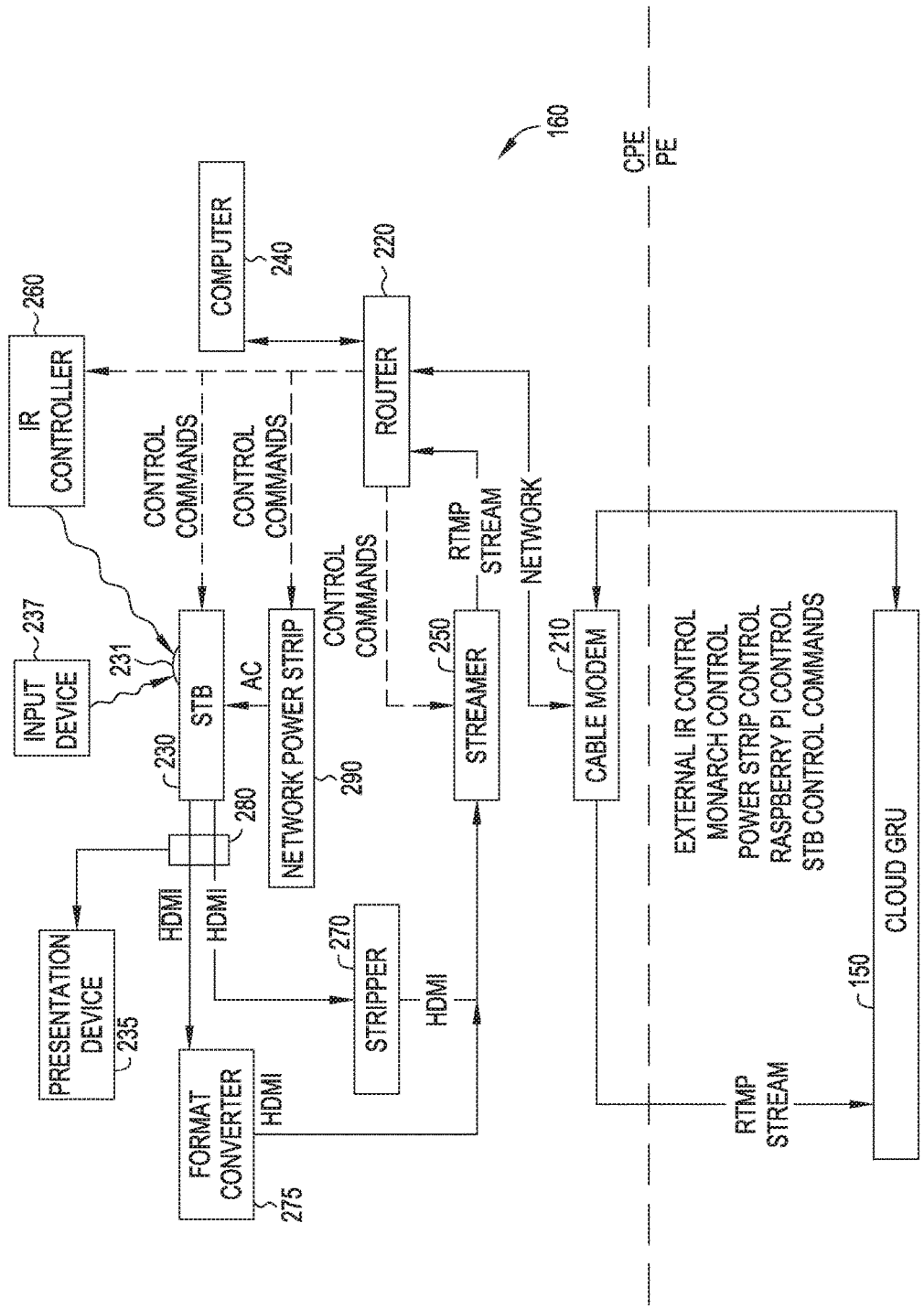
FIG. 2 depicts a high-level block diagram of Customer-premises equipment (CPE) in accordance with various embodiments and suitable for use in the system of FIG. 1.

FIG. 2 depicts a high-level block diagram of Customer Premises equipment (CPE) in accordance with various embodiments and suitable for use in the system of FIG. 1. Specifically, FIG. 2 illustrates a "basic" CPE configuration along with various and different configurations in accordance with the embodiments as described herein.

A "basic" CPE configuration generally comprises a cable modem 210, a router 220, a set top box (STB) 230, presentation device 235 and input device 237. The router 210 is configured to communicate with distribution network 140 via cable modem 210. The router 210 is also configured to communicate with the STB 230 and, if present, a computer 240. The STB 230 may comprise a set-top terminal, set-top box, communications terminal, computer, hand-held tablet or other computing device, smartphone and/or other device capable of interacting with service provider equipment via the distribution network 140. The presentation device 235 may comprise any display device, such as a conventional television, a computer monitor, a computer display, a smart phone display and so on. The input device 237 may comprise any input device, such as a remote control, a keyboard, a touch screen device and so on. Generally speaking, the STB 230 receives from the input device 237 data indicative of user interaction with the input device 237. For example, input data from input device 237 (e.g., a handheld remote control) may comprise infra-red (IR) data received via an IR receiver port 231 of the STB 230. Generally speaking, the STB 230 provides presentation signals of still or moving imagery suitable for presentation via the presentation device 235 such as by, illustratively, an HDMI, VGA, component or other audiovisual signal or protocol.

The basic CPE configuration described above works well until it doesn't. In the event of a problem, the subscriber troubleshoots a problem with or without the help of a technical representative or customer services representative of the service provider.

In various embodiments, "enhanced" CPE configurations are provided to automate some or all of the troubleshooting process, to provide a mechanism supporting testing and auditing functions, and to provide greater control over subscriber CPE.

In one embodiment, an enhanced CPE configuration is provided using a streamer 250. The streamer 250 is configured to accept an output presentation signal provided by the STB 230 (e.g., an HDMI signal, VGA signal or other presentation signal), process the presentation signal to provide a transport stream (e.g., a stream according to the RTMP format or some other stream format), and forward the presentation signal representative transport stream to the PCP 150 via router 220, modem 210 and distribution network 140. In various embodiments, the operation of the streamer 250 is configured in response to PCP control commands provided via, illustratively, the router 220. In various embodiments, streamer 250 may be implemented using a device denoted as "MonarchHD" which is manufactured by Matrox of Dorval, Quebec, Canada.

In some embodiments, a coupler 280 is used to couple the output presentation signal provided by the STB 230 to either the streamer 250 or presentation device 235. In some embodiments, the coupler 280 comprises a splitter which operates to provide substantially identical first and second split presentation signals to, respectively, the presentation device 235 and the streamer 250. In some embodiments, the coupler 280 comprises a switch which operates to presentation signal provided by the STB 230. In various embodiments, the operation of the streamer 250 is configured in response to PCP control commands provided via, illustratively, the router 220.

In some embodiments, a stripper 270 is used to strip away encryption information associated with the output presentation signal provided by the STB 230. For example, some STBs provide an HDMI presentation signal utilizing High-Bandwidth Digital Content Protection (HDCP), a copy protection scheme utilizing encryption and source/destination handshaking to transfer presentation data there between. In these embodiments, the stripper 270 operates to effect an HDMI audiovisual data transfer between the STB 230 and the stripper 270, to produce thereby a strict HDMI presentation signal which is in turn processed by the streamer 250 as described above. In various embodiments, the operation of the stripper 270 is configured in response to PCP control commands provided via, illustratively, the router 220. In various embodiments, stripper 270 may be implemented using a device denoted as "HDCP Stripper" which is manufactured by the Sewell Direct of Orem, Utah. In various embodiments, the operation of the stripper 270 is implemented as a functional element of the streamer 250.

In some embodiments, a format converter 275 is used to format or transcode the output presentation signal provided by the STB 230. For example, the former converter 275 may be used to convert between VGA, HDMI and/or other formats appropriate to STB output presentation signals. The format converted presentation signal is in turn processed by the streamer 250 as described above. In various embodiments, the operation of the format converter 275 is configured in response to PCP control commands provided via, illustratively, the router 220. In various embodiments, the format converter may be combined with the streamer component as a single device performing both functions.

In some embodiments, an infra-red (IR) controller 260 is used to provide PCP control commands to the STB 230 via IR port 231. Such PCP control commands may mimic those associated with an input device 237 or, more broadly, comprise any commands capable of configuring the STB 232 perform some intended function. As a practical matter, IR controller 260 is physically located in such a way as to allow an IR signal transmitted therefrom to be received at IR port 231 of STB 230. Commands of interest include power on/off, channel change, volume up/down, VOD selection, presentation signal format adjustment, input port selection, output port selection and so on. Generally speaking, IR controller 260 enables a remote entity such as PCP 150 to configure the STB 230 to generate information indicative of an operational parameter or delivered QoE of interest. In various embodiments, IR controller 260 may be implemented using a device denoted as "Network IR Blaster" which is manufactured by Global Cache of Jacksonville, Oreg.

In some embodiments, additional or different controllers 260 (not shown) such as Bluetooth controllers, Wi-Fi controllers and other controllers may be used to provide PCP control commands to Bluetooth or Wi-Fi responsive devices, including devices other that an STB. Generally speaking, the use of such controllers provides a mechanism whereby local functions normally performed via user interaction with a local device emitting a local control signal (e.g., a remote control device emitting IR control signals, a smart phone emitting Bluetooth or Wi-Fi control signals and the like) may be performed by a remote user or test platform.

In some embodiments, a networked power strip 290 is used to controllably cycle AC power (i.e., remove AC power, then restore AC power) to one or more AC power components of subscriber CPE 160. For example, the network power strip 290 may be used to remove and then restore AC power to one or more of the STB 230, router 220, cable modem 210 and/or any other AC powered component within subscriber CPE 160. In various embodiments, the operation of the network power strip 290 is configured in response to PCP control commands provided via, illustratively, the router 220. In various embodiments, networked power strip 290 may be implemented using a device denoted as Web Power Switch 7 which is manufactured by Digital Loggers of Santa Clara, Calif.

The above-described embodiments of the PCP 150 in conjunction with "enhanced" subscriber CPE 160 such as with PCC 165 finds particular utility within the context of a number of use cases as described herein and above. Such use cases include:

Automated Use Case Monitoring
    Is VOD feature and trailer playback successful, Can I change settings successfully, etc.
Automated Video Quality Monitoring
    Evaluate the availability and quality of video and audio delivery at the end of the full delivery pipeline
    Iterate through the entire channel lineup and inspect each channel for lack of video, frozen video, and other quality metrics
Cloud Session Checks
    Inspect availability of cloud UI session
    Inspect for specific cases: proper guide delivery (wonky guide, gray guide, etc.)
    Inspect for quality of video delivery of cloud UI
    Performance monitoring
    Channel tune timing
    Cloud session load timing FIG. 3 depicts a high-level block diagram of a customer experience verification system operably coupled to a plurality of remote physical devices and suitable for use with the system of FIG. 1 and/or the CPE of FIG. 2.

Figure 3:
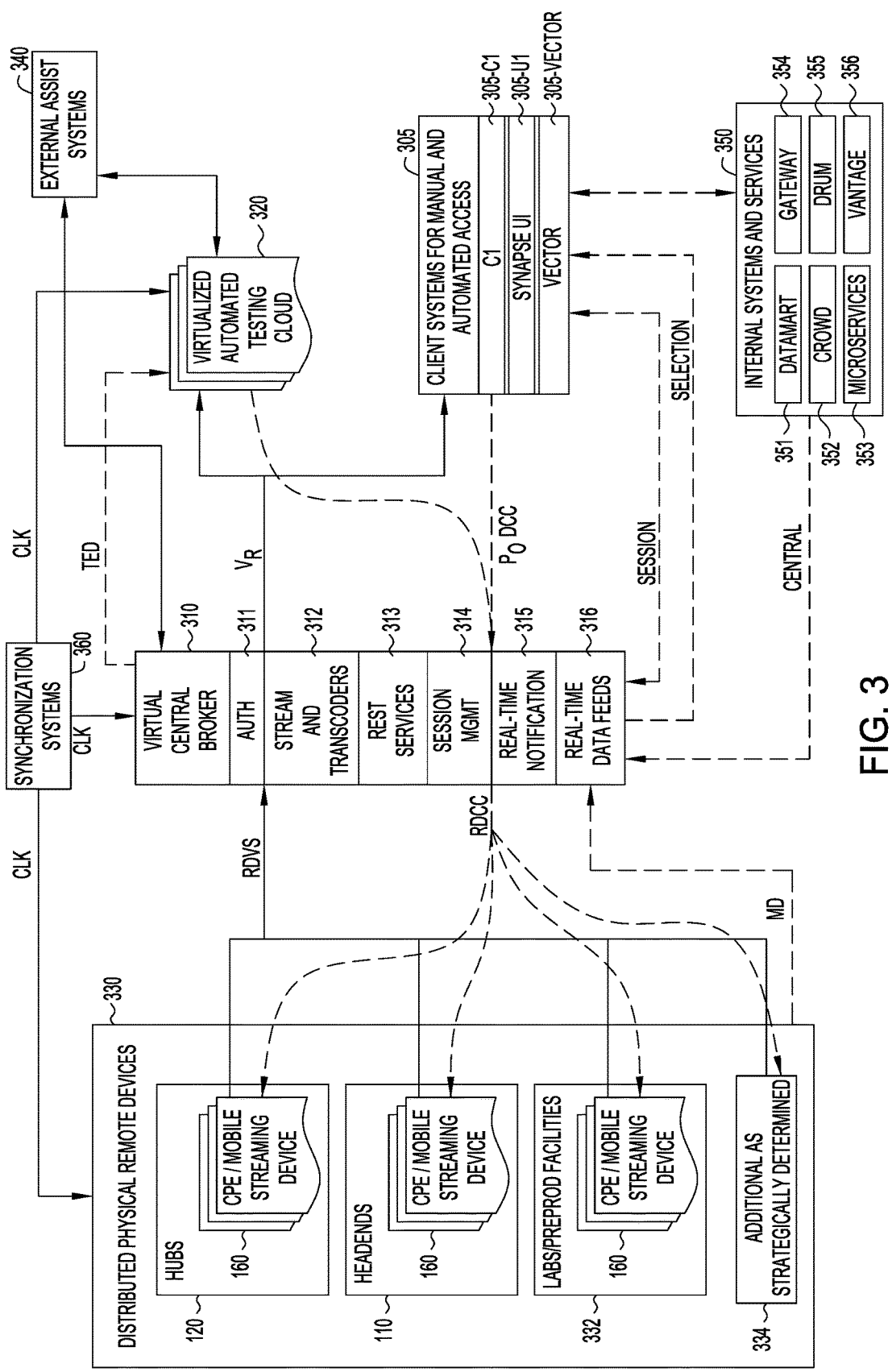
FIG. 3 depicts a high-level block diagram of a customer experience verification system operably coupled to a plurality of remote physical devices and suitable for use with the system of FIG. 1 and/or the CPE of FIG. 2.

Generally speaking, the customer experience verification system 300 of FIG. 3 comprises various functional elements implemented as hardware or as a combination of hardware and software within at least some provider equipment (PE) and customer premises equipment (CPE) to perform various customer experience verification functions such as described herein. These functional elements may be implemented within the context of PE and/or virtualized PE performing various network management functions within a content delivery system, cable television distribution system or other system providing content and/or network services.

The customer experience verification system 300 of FIG. 3 is depicted as comprising one or more client systems/application for manual and automated access 305 operably coupled to a virtual (or nonvirtual) central broker 310 and configured to support manual and/or automatic access to various functions within the central broker 310. The central broker 310 is operably coupled to remotely located or distributed physical devices 330 comprising CPE 160 (e.g., set top boxes, routers, wireless access points, home monitoring systems, "internet-of-things" sensors, mobile streaming devices and the like) accessed via corresponding hubs 120, head ends 110, laboratory/preproduction facilities 332 and/or additional devices or entities 334 as needed. The various remotely located or distributed physical devices 330 may provide to the central broker 310 automated device and stream metadata either automatically or in response to a query/command from the central broker 310.

The system 300 is further depicted as including a virtual (or nonvirtual) automated testing cloud/platform 320, various remote devices 330, one or more optional external (with respect to the managed system) assist systems 340, various optional internal (with respect to the managed system) systems and services 350, and an optional synchronization system 360.

The central broker 310 comprises a collection of hardware and/or hardware plus software components that implement various functional elements or modules to abstract and manage communication with, illustratively, the CPEs 160 and automated testing cloud/platform(s) 320. The central broker 310 is depicted as, but not limited to, comprising an authentication module 311, various stream generation and transcoder modules 312, a REST services module 313, a session manager 314, a real-time notifications module 315 and a real-time data feeds module 316.

The central broker 310 permits authenticated, shared use of a collective pool of CPEs 160 between automated systems and manual use systems, and provides application programming interfaces (APIs) and data services to communicate with those systems as well as integrate with other internal/external systems as needed. These data services may include real-time data feeds to highlight and review behavioral performance at a discrete level as the system is used in addition to the normal audio/visual feedback.

The remotely located or distributed physical devices 330 comprises a set of entities (e.g., CPE or portions thereof) including entities that are being tested along with the hardware and hardware/software elements that are required to perform this testing (locally or remotely). The entities may be augmented to include additional hardware and hardware/software elements to perform remote troubleshooting, repair and/or reconfiguration of the various remote CPE 160 and so on. The testing/monitoring entities may be distributed across geographically or logically selected regions as desired to act as monitoring points. The testing/monitoring entities may be used to stream video feeds from attached equipment such as CPE 160 toward the central broker 310. The various remote physical devices 330 may be configured to automatically provide device and video stream metadata information to the central broker 310 via data path MD as depicted herein.

The automated testing platform 320 may comprise a virtualized or non-virtualized test platform configured to conduct automatic testing of CPE 160 based upon video streams and/or other information received from the CPE 160 under test. A virtualized "testing cloud" implementation advantageously improves system portability for remote and local QoE evaluation. The automated testing platform 320 may generate remote device control commands (RDCCs) to control thereby remote CPE such as within the context of a desired test or suite of tests.

The automated testing platform 320 may interact with the central broker 310 to exchange test execution data (TED) to ensure the testing is performed in a manner optimizing resources and efficiency, such as by identifying the appropriate CPE or other remote devices to test depending upon the test purpose, extracting the appropriate test data via corresponding test suites, vectors or scripts, and/or performing the various testing functions described herein in a priority driven manner to preferentially extract the more important or actionable test information first. Priority may be defined in terms of customer service level (e.g., gold, silver or bronze) such as defined in a customer service level agreement (SLA), a preferred customer or third-party, and identified trouble area within the network (e.g., congested region, type of CPE tending to work poorly and so on), CPE in need of software revision, CPE associated with more frequent customer complaints and so on.

In various embodiments the QoE associated with particular CPE may be evaluated using an output video or, more generally, audiovisual signal generated by a set top box (STB) and normally intended for presentation to a subscriber or user that has been captured/streamed to the automated testing platform 320.

The automated testing platform 320 may evaluate image-related QoE in accordance with image quality parameters such as resolution, frame rate, spatial artifacts, motion artifacts, color accuracy and so on associated with the captured/streamed video signal. If audio information is available, the automated testing platform 320 may evaluate audio-related QoE in accordance with audio quality parameters such as dynamic range, distortion, audio artifacts and so on. QoE may also be evaluated in accordance with STB performance parameters, such as speed/responsiveness of the STB user interface (UI) when responding to control commands, accuracy of STB rendering of UI graphic information, video inset information, audio information and the like. QoE may also be evaluated in accordance with service level agreement (SLA) compliance by verifying that appropriate/purchased subscriber channels are in fact available to the subscriber and inappropriate/unpurchased subscriber channels are not available to the subscriber. Other compliance verification may also be evaluated, such as appropriate content black out in a region associated with CPE under test and so on.

The optional external assist systems 340 comprise, in various embodiments, a set of high-value, non-trivial test functions which may also be used to evaluate CPE 160 or other entities. In various embodiments, these high-value test functions may be different (e.g., more detailed testing or test result processing) than those provided by the automated testing platform 320 and/or central broker 310 to provide thereby additional testing/analysis functions or capability. In various embodiments, external assist systems 340 provide load sharing, load balancing and/or redundancy to the automated testing platform or other entities performing testing or analysis functions.

The optional synchronization systems 360 provide a central timing reference CLK for distributed system elements such that data may be temporally aligned without skew from network and processing delays to enable thereby the performance of accurate timing analysis of events triggered at or delivered to disparate remote systems.

In various embodiments, one or more of the various distributed remote physical devices 330, the virtual central broker 310 and the automated testing platform 320 receive timing information CLK from the synchronization system 360 to enable thereby time stamping of video streams, audiovisual streams, data streams, event indications, and/or relevant metadata associated with such streams or indications, as well as synchronization of these entities/systems. For example, in various embodiments, video streams provided by CPE are time stamped by the CPE or time-synchronized system elements along the video stream transmission path to enable accurate, absolute/universal temporal reconstruction (real time or off-line after storage/buffering) of the video imagery displayed to a customer at a CPE presentation device.

In a remote analysis mode of operation, the embodiments provide a mechanism by which remote test personnel may invoke specific test/analysis functions associated with CPE or PE such as in response to an identified problem. Similarly, automated response mechanisms such as instantiated within PE servers may invoke these specific test/analysis functions in response to the identified problem. For example, by remotely reviewing and analyzing video input at the same quality as the source video output without any transcode artifacts of a device under test and accurate determination may be made regarding user QoE, CPE performance and so on.

In a testing/auditing mode of operation, the embodiments may provide a mechanism by which test/audit mechanisms such as instantiated within PE servers may invoke specific test/analysis functions associated with CPE or PE to record video data as well as other QoE related data for subsequent analysis. For example, temporal, spatial, motion and other artifacts associated with a video stream from a device under test may be examined in detail to determine the QoE associated with the video stream generated by the device.

The client systems/application for manual and automatic access 305 comprises, illustratively, user facing applications executed upon a handheld computing device or other computing device to enable thereby interaction with the central broker 310 and internal systems 350 to enable network operator or service personnel to control and manage remote CPE 160, verify customer QoE and perform other tasks. The client systems/application 305 is depicted as comprising various application/functional modules, illustratively a CI module 305-CI, a Synapse client application module 305-UI and a vector module 305-VECTOR. The Synapse client application module 305-UI provides human interface functions to allow interaction with CPE or PE devices such as to request tests, retrieve aggregated test results and so on. The vector module 305-VECTOR allows users to schedule, review and manage automated test cases with the system such as to exercise target CPE. The CI module 305-CI is used to aggregate test result data for alerting and global review from a monitoring perspective. The goals of these systems as disclosed are to generally leverage the larger platform capabilities to improve operational efficiency by reducing tedious and redundant work, focusing attention where it's needed when issues arise by identifying problems using automated methods, and permitting deep access to a real-time perspective of the entire network to minimize delay in identifying and resolving issues. It will be appreciated by those skilled in the art that the client system/applications 305 may comprise other or different application/functional modules depending upon desired functions to be implemented thereby.

The client system/application 305 may generate remote device control commands (RDCCs) for use by remote CPE such as within the context of a desired test or suite of tests. For example, the client system/application 305 when operated by service personnel may be used to invoke specific tests of predefined CPE to enable thereby remote monitoring and control of customer CPE to verify CPE operation, verify subscriber QoE and diagnose customer problems. In various embodiments, service personnel or customer administrative personnel may use the client system/application 305 to confirm and/or address customer QoE issues. The client system/application 305 is depicted as sharing session management information with the central broker 310, such as to provide user and context-based remote device access and session management functions via the datapath denoted as SESSION, and to provide information supporting centralized integration for data driven region specific test execution via a datapath denoted as CCENTRAL. The client system/application 305 is also depicted as receiving remote device (e.g., CPE) identification information, filtering and selection information via the datapath denoted as SELECTION. The client system/application 305 is also depicted as sharing information with the internal systems and services 350, such as subscriber account information, subscriber CPE identification (e.g., serial number) and authentication information, network status information and so on.

The internal systems and services 350 comprise various internal systems of a network services provider configured to help evaluate the results of tests being performed. In various embodiments, internal systems and services 350 permit complementary validation and verification of customer experience parameters by operating in an integrated manner with other alerting systems to properly validate when, where and how certain operational issues have arisen and how these issues may affect the end user/customer experience.

The internal systems and services 350 may interact with and provide desired test/management level functionality to the client system/application for manual and automatic access 305. Similarly, the internal systems and services 350 may provide centralized integration functions to enable data driven, region specific, hub specific, head end specific, CPE specific and other defined scope test execution information. Such information enables the characterization of defined portions of the entire system with respect to QoE as well as general system health.

The internal systems and services 350 is depicted as comprising a datamart module 351 (e.g., a database storing customer/CPE data), a crowd module 352 (e.g., an authentication service), a micro services module 353 (e.g., API functions according to locations and the like), a gateway module 354 (e.g., a credential authentication tool), a DRUM module 355 (e.g., a tool providing access to subscriber/customer information) and a vantage module 356 (e.g., a tool providing a real-time view of data within the data mart module, such as for evaluating retrieved information, results of tests and the like). For example, in one embodiment, a set of test is automatically implemented to identify problems or potential problems at customer CPE. When such problems are identified (e.g., determined QoE associated with a remote client device or CPE being less than a target QoE threshold level), alarms or warnings may be generated, repair tickets may be issued and/or other corrective actions may automatically initiated including information identifying defects discovered during automatic testing/auditing functions.

The virtual central broker 310 selectively controls operation of one or more CPE 165 via appropriate remote device control commands (RDCC) such as delivered by Internet Protocol (IP) packet/message and resulting in local CPE Infrared (IR) commands, Radio Frequency (RF) commands and the like suitable for controlling and/or interacting with the local CPE. For example, in a Verification of Remote Customer Video Experience use case, RDCC generated by the virtual central broker 310 configures one or more CPE 160 to produce a corresponding remote device video stream RDVS including video imagery representative of the video imagery presented to a corresponding remote customer, such as a customer viewing streamed video on a display device associated with a STB or mobile device. In various embodiments, the RDCCs regenerated by the automated testing platform 320 and/or client systems/application for manual and automatic access 305 for propagation toward CPE 160 and other remote devices via the virtual central broker 310.

The RDVSs provided by CPE 160 are received by the central broker 310 and split or otherwise coupled to one or both of the automated testing platform 320 and client systems/application 305.

Communication to control and manage the CPEs 160 may start at the client system/application 305 or the automated testing platform 320 and flow through the central broker 310 and various intermediate entities (e.g., hubs, head ends, routers and the like) to the CPEs 160. In various embodiments a similar communication flow is provided for other real-time data streams that originate at the CPE such as video streams, audiovisual streams, CPE status/performance data, CPE requests and/or acknowledgments and so on. However, during a local QoE test a remote video stream may not be available or necessary depending on local CPE resources.

In various embodiments, the central broker 310 communicates with internal systems and services 350 as necessary, such as where a mutual integration of other internal alerting systems will permit faster verification of issues and appropriate escalation. In this case, another alerting system may be used to initiate communication with the central broker 310 due to signs of failure that it may detect and need to validate.

The optional synchronization systems 360 may be continually running to maintain time synchronization between all of the distributed devices and provider equipment elements. The optional synchronization systems 360 enable more accurate temporal evaluation of remote device video streams as well as other information, whether in real time or during a post-processing operation of previously stored in with device video streams or other information.

Generally speaking, the various embodiments enable remote operation, testing and general control of subscriber CPE via control data transmitted to the CPE via the central broker, which results in the subscriber CPE generating and transmitting toward the central broker a video stream, audiovisual stream, data stream, meta data or other information. The control data may be responsive to automatic test procedures executed within the automatic testing platform 320, manual tests/requests of service personnel interacting with the client systems/application for manual and automatic access 305 and so on.

The CPE generated video stream, data stream, audiovisual stream, data stream, meta data or other information may be evaluated to determine if specific QoE/QoS levels or expectations are being met by the CPE. Such evaluations may comprise, illustratively, whether or not the video imagery generated by the CPE (presentation video and/or UI) correct in terms of being that which should be displayed, of sufficient quality in terms of frame rate, motion artifacts, dropped packets/frames, glitches, improper audio level, lip sync problems and the like; whether or not event data or alarm/warning data is indicative of CPE failure or degraded performance; whether or not any particular QoE, QoS or other parameter is indicative of an alarm or warning condition, below a threshold level of acceptable quality (e.g., more than an allowable number of dropped frames, glitches and the like).

The evaluation may be performed in an automated manner such as by the automated test platform 320. The evaluation may also be performed via service personnel directly (e.g., subjective assessment of image quality, evaluating specific functions of CPE and the like) using the client systems/application for manual and automatic access 305, or by an application executed at the client systems/application for manual and automatic access 305. The testing and evaluation of CPE as described herein is directed to determining whether CPE exhibit direct or indirect indications of failure, performance degradation and/or over-utilization of the CPE or various elements, components or portions thereof.

Figure 4:
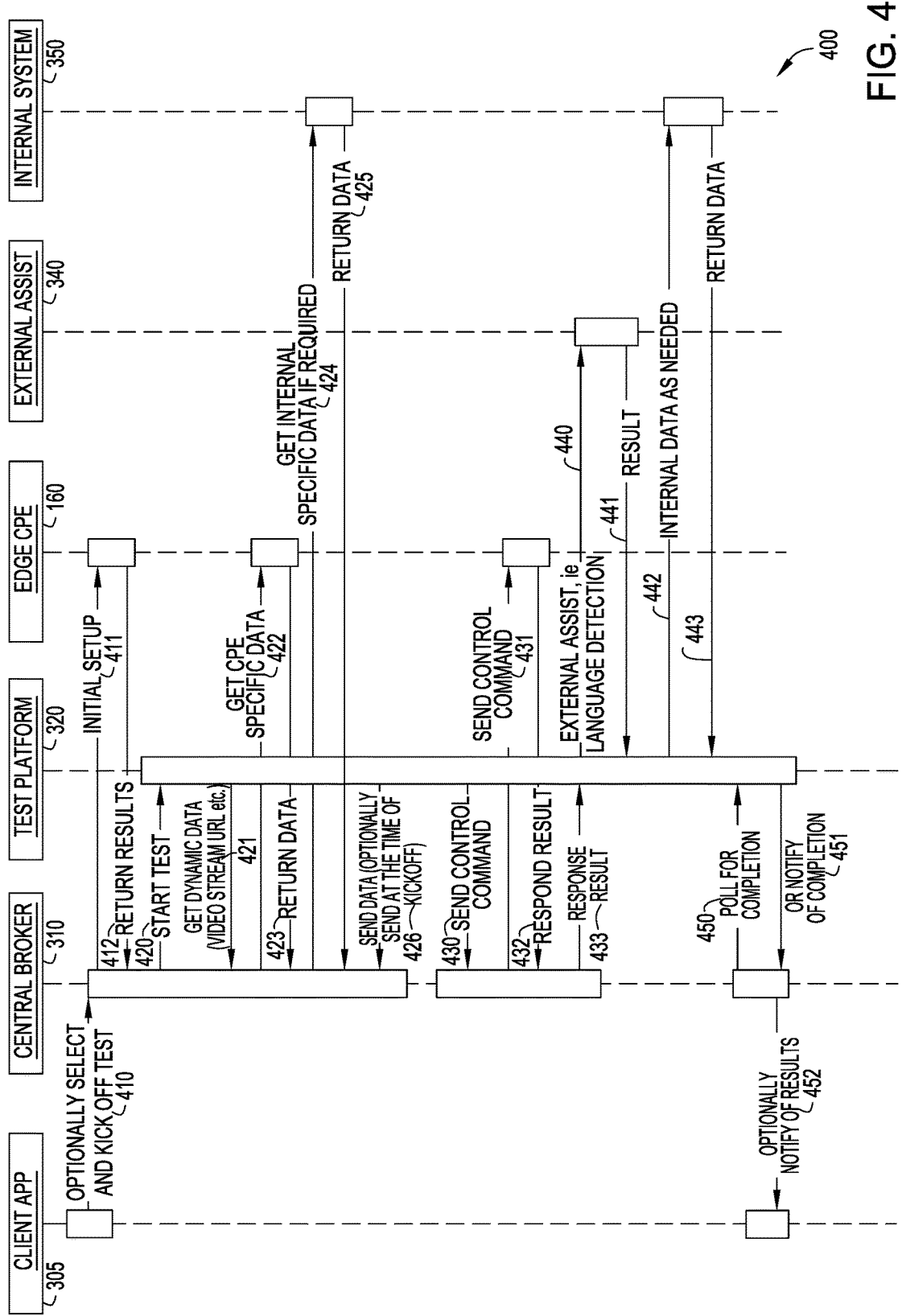
FIGS. 4-8 depict flow diagrams of methods according to various embodiments.

FIG. 4 depicts a flow diagram of a method according to one embodiment. Specifically, the method 400 of FIG. 4 provides automatic testing of CPE via a remote (with respect to the CPE) testing platform. The method 400 of FIG. 4 is represented by a sequence of actions taken by various system entities within the context of an automated remote test embodiment. The sequence of actions comprises a plurality of actions including actions for generating information indicative of an operational parameter or delivered QoE of interest associated with a remote device such as CPE 160.

The method 400 of FIG. 4 contemplates actions taken by one or more of client system/application 305, central broker 310, CPE 160, external assist systems 340 and internal assist systems 350.

At step 410, client system/application 305 optionally selects a test to be performed and initiates the performance of the selected test via a message sent to the central broker 310. In various embodiments, the central broker 310 periodically performs various tests in accordance with a predefined testing schedule. In various embodiments, the central broker 310 performs various tests in response to event information indicative of degraded performance of CPE 160, hubs 120, head end 110, and/or other provider couldn't.

At step 411, the central broker 310 transmits an initial set up command to the CPE 160, such as to configure thereby CPE tuning parameters, presentation parameters and/or other parameters associated with a test to be performed.

At step 412, the central broker 310 receives a response indicative of whether the setup command has been received and, optionally, whether the various set up parameters have been configured properly.

At step 420, the central broker 310 transmits a test initiation command.

At step 421, the central broker 310 receives dynamic data such as a video stream uniform resource locator (URL) associated with a CPE presentation monitoring stream (e.g., RTMP stream provided by streamer 250) and/or other dynamic data associated with information to be retrieved by the central broker 310 as part of the test to be performed.

At step 422, the central broker 310 transmits a "get" command to the CPE 160 to retrieve therefrom specific data of interest, which data is received by the central broker 310 at step 423.

At optional step 424, the central broker 310 transmits a "get" command to the internal system 350 to retrieve therefrom specific data of interest, which data is received by the central broker 310 at step 425.

At step 426, the data received by the central broker 310 is transmitted to the test platform 324 further processing.

At step 430, the central broker 310 receives test control commands associated with the test to be performed from the test platform 320 and, at step 431, transmits those test control commands to the CPE 160. At step 432, the central broker 310 receives a response result indicative of whether the test control commands have been received and, optionally, whether CPE 160 has been successfully configured in response to the test control commands. At step 433, the central broker 310 transmits the response result from the CPE 162 of the test platform 320 for further processing such as determining or verifying CPE performance parameters, customer experience level and the like.

At step 440, the test platform optionally transmits information to an external assist system 340 for use in further evaluating CPE 160. At step 441, the central broker 310 receives a result of the further evaluation from the external assist system 340.

At step 442, the test platform optionally transmits information to an internal assist system 350 for use in further evaluating CPE 160. At step 443, the central broker 310 receives a result of the further evaluation from the internal assist system 350.

At step 452, the central broker 310 optionally notifies client system/application 305 of the results of the test. Such notification may be made after receiving an indication of completion of testing via test platform 320 polling (step 450) or direct notification (step 451).

Figure 5:
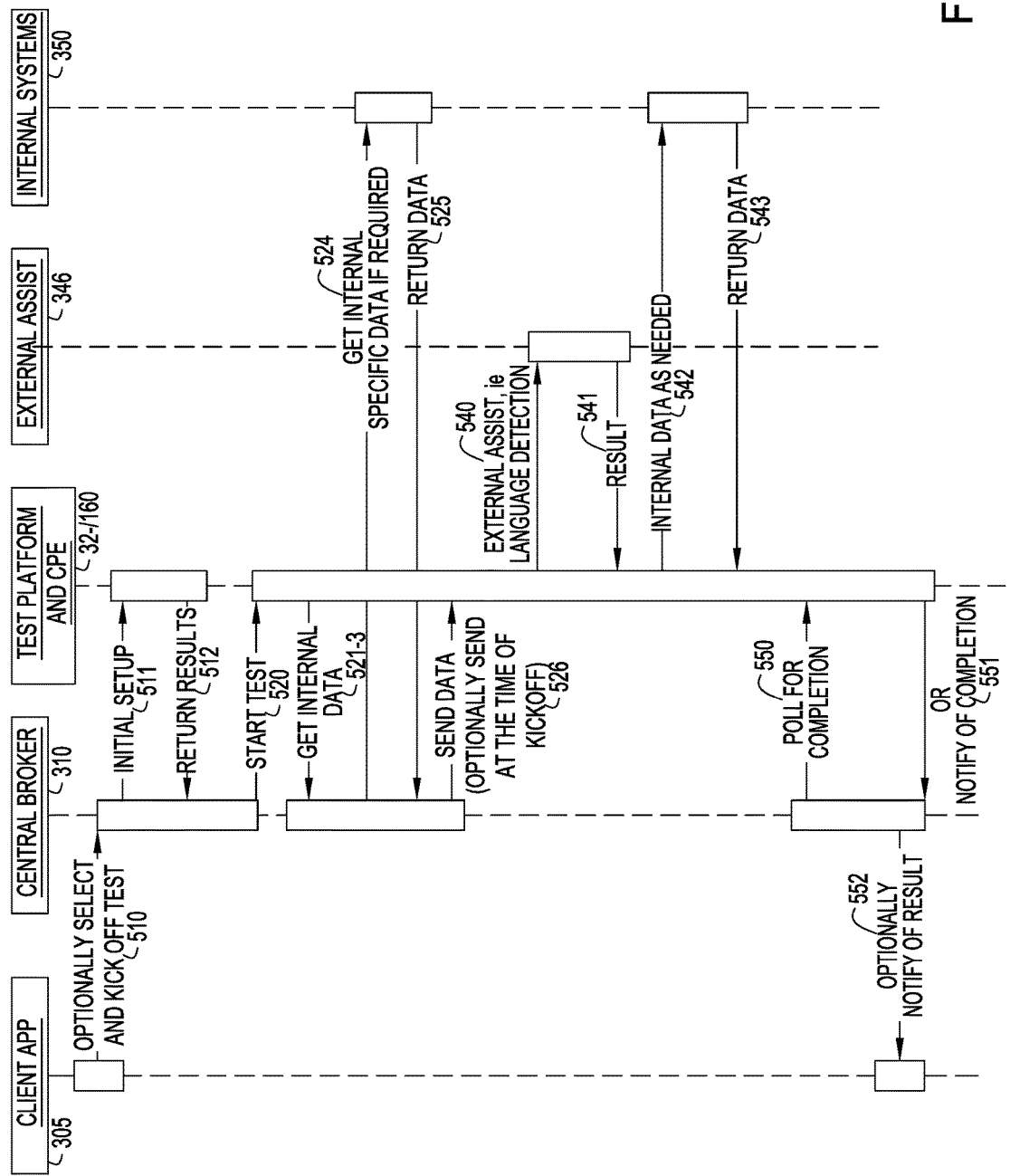

FIG. 5 depicts a flow diagram of a method according to one embodiment and represented by a sequence of actions taken by various system entities.

Specifically, the method 500 of FIG. 5 provides automatic testing of CPE using a local (with respect to the CPE) testing platform. That is, the testing platform is integrated with or closely associated with the CPE under test.

The method 500 of FIG. 5 is similar to the method 400 described above with respect to FIG. 4, except that the method 500 of FIG. 5 contemplates the use of a testing platform integrated with and in direct communication with the CPE, whereas the method 400 of FIG. 4 contemplates the use of a testing platform local to the CPE and communicating with the CPE via the central broker 310.

Steps 510-520 are implemented in substantially the same way as described above with respect to steps 410-420 of the method 400 of FIG. 4 to thereby set up and initiate a test to be performed.

At step 521-3, the central broker 310 gets internal data from the integrated test platform and CPE 320/360 such as described above with respect to steps 421 and 423 of the method 400 of FIG. 4.

Remaining steps 524-526 and 540-552 are implemented in substantially the same way as described above with respect to steps 424-426 and 440-452 of the method 400 of FIG. 4.

Figure 6:
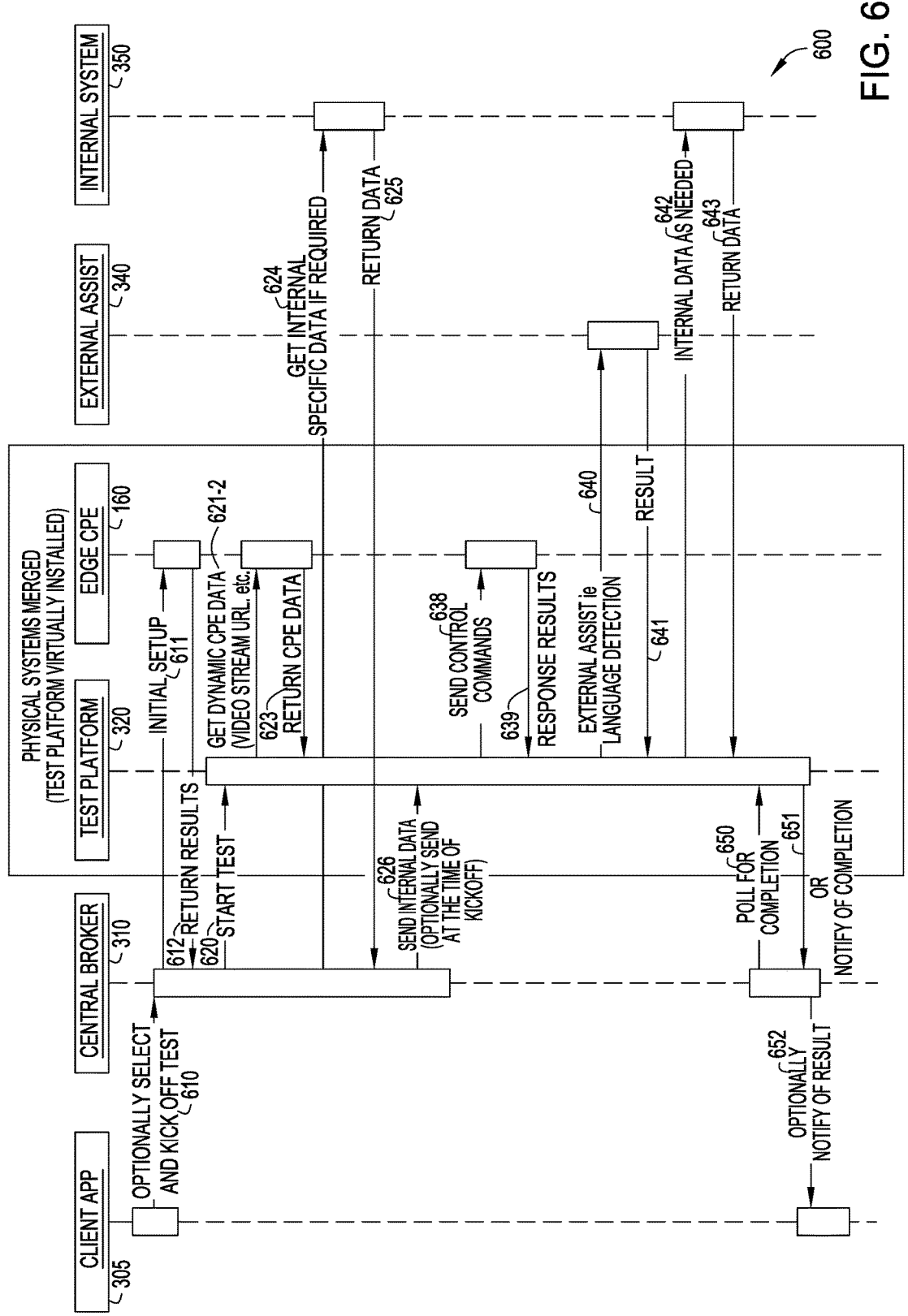

FIG. 6 depicts a flow diagram of a method according to one embodiment and represented by a sequence of actions taken by various system entities. Specifically, the method 600 of FIG. 6 provides automatic testing of CPE using a local (with respect to the CPE) testing platform in which the test platform 320 comprises a virtualized test platform installed within the CPE 360. The method 600 of FIG. 6 is similar to the method 400 described above with respect to FIG. 4.

Steps 610-620 are implemented in substantially the same way as described above with respect to steps 410-420 of the method 400 of FIG. 4 to thereby set up and initiate a test to be performed.

At step 621-2, the test platform 320 transmits a "get" command to the CPE 160 to retrieve therefrom specific data of interest such as a video stream uniform resource locator (URL) associated with a CPE presentation monitoring stream (e.g., RTMP stream provided by streamer 250), other static or dynamic data from the CPE 160 and/or other information to be retrieved as part of the test to be performed, which data is received by the test platform 320 at step 623.

At optional step 624, the central broker 310 transmits a "get" command to the internal system 350 to retrieve therefrom specific data of interest, which data is received by the central broker 310 at step 625 and transmitted to the test but for 320 at step 626.

At step 638, the test platform 320 transmits test control commands associated with the test to be performed to the CPE 160. At step 639, the test platform 320 receives a response result indicative of whether the test control commands have been received and, optionally, whether CPE 160 has been successfully configured in response to the test control commands.

Remaining steps 640-652 are implemented in substantially the same way as described above with respect to steps 440-452 of the method 400 of FIG. 4.

Figure 7:
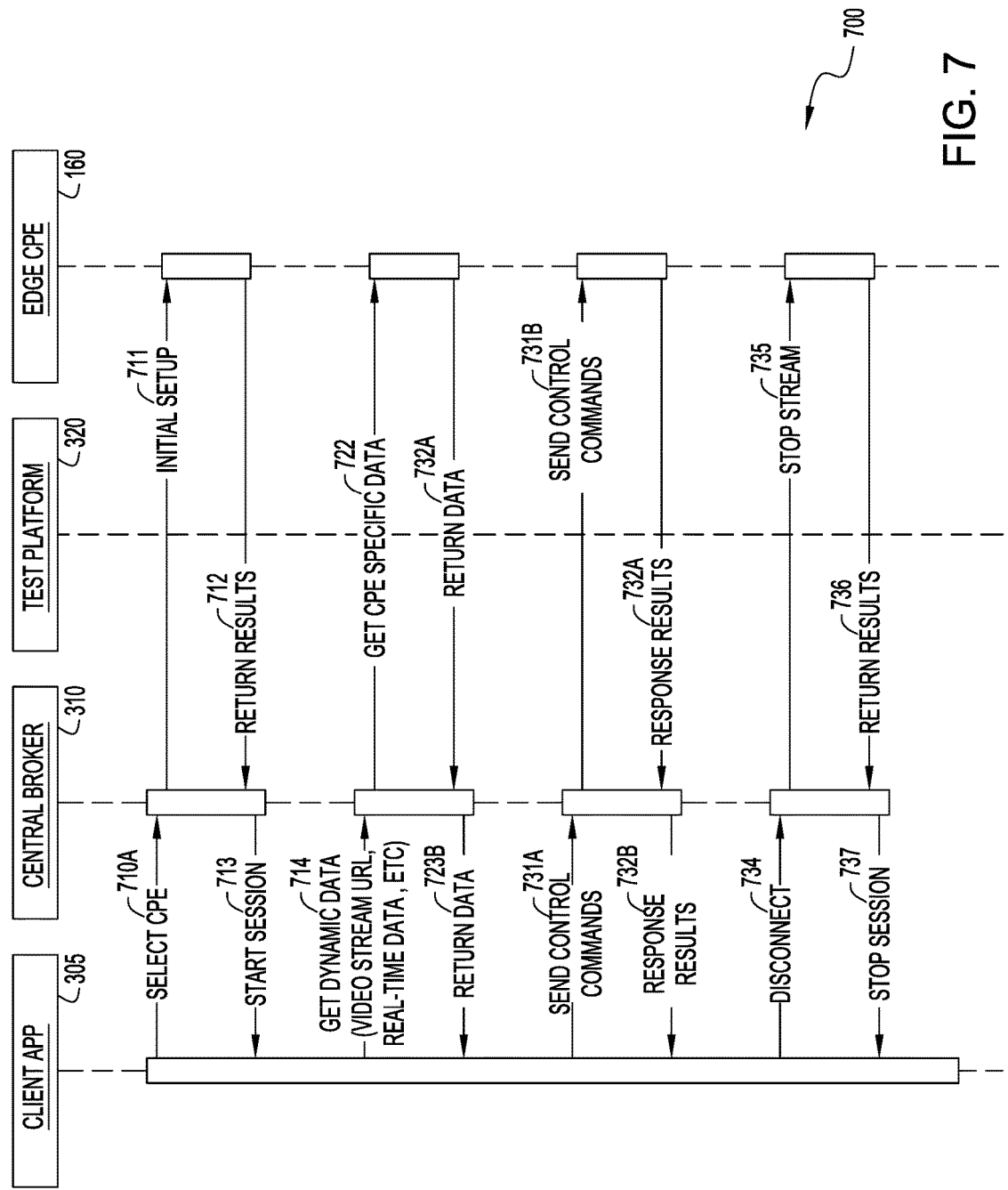

FIG. 7 depicts a flow diagram of a method according to one embodiment and represented by a sequence of actions taken by various system entities. Specifically, the method 700 of FIG. 7 provides manual remote testing of CPE wherein a user (e.g., service provider technical support personnel) interacting with client system/application 305 such as using a remote computing device (e.g., technical support computer or wireless device) in communication with central broker 310 may select specific CPE 160 for testing.

At step 710A, the client system/application 305 transmits a CPE selection message to the central broker 310. At step 711, the central broker 310 transmits an initial set up command to the selected CPE 160, such as to configure thereby CPE tuning parameters, presentation parameters and/or other parameters associated with a test to be performed.

At step 712, the central broker 310 receives a response indicative of whether the setup command has been received and, optionally, whether the various set up parameters have been configured properly.

At step 713, the central broker 310 initiates a session with the client system/application 305. Within the context of this session, user interactions via the client system/application 305 enable user to perform various testing and equipment exercising functions pertaining to the selected CPE 160. In various embodiments, the user via the client system/application 305 may cause the central broker 310 to perform various functions previously described as performed by the central broker 310.

At step 714, the client system/application 305 transmits to the central broker 310 a "get" command intended for propagation to the CPE 160 to request therefrom dynamic data such as a video stream uniform resource locator (URL) associated with a CPE presentation monitoring stream (e.g., RTMP stream provided by streamer 250) and/or other dynamic data associated with information to be retrieved from the CPE 160 as part of the test to be performed.

At step 722, the central broker 310 transmits the "get" command to the CPE 160 to retrieve therefrom the specific data of interest, which data is received by the central broker 310 at step 723A and propagated therefrom to the client system/application 305 at step 723B.

At step 731A, the client system/application 305 transmits to the central broker 310 test control commands associated with the test to be performed and intended for propagation to the CPE 160. At step 731B, the central broker 310 transmits those test control commands to the CPE 160.

At step 732A, the central broker 310 receives a response result indicative of whether the test control commands have been received and, optionally, whether CPE 160 has been successfully configured in response to the test control commands. At step 732B, the central broker 310 transmits the response result from the CPE 160 to the client system/application 305 for further processing such as by service personnel evaluating the operation of CPE 160 to determine or verify CPE performance parameters, customer experience level and the like.

At step 734, the client system/application 305 transmits a "disconnect" message to the central broker 310. At step 735, the central broker 310 transmits a "stop stream" or "stop test" message to the selected CPE 160 to terminate the test procedure. At step 736, the central broker 310 receives a returned result from the CPE 160 indicative of an acknowledgment of the "stop" message, updated status information and/or other information. At step 737, the session between the central broker 310 and client system/application 305 is terminated.

Figure 8:
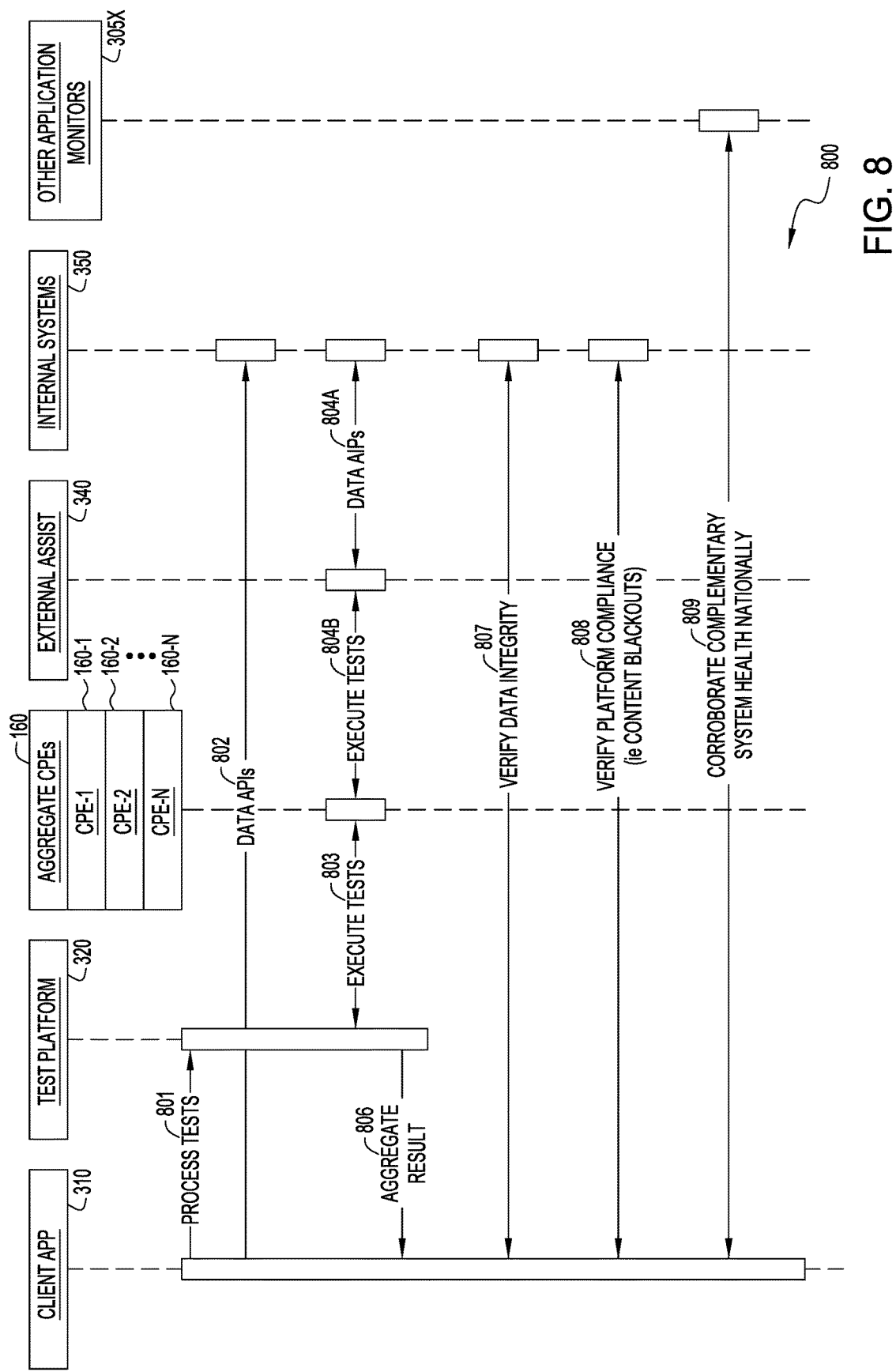

FIG. 8 depicts a flow diagram of a method according to one embodiment and represented by a sequence of actions taken by various system entities to provide global verification of system operation, customer QoE and the like.

At step 801, the central broker 310 transmits process testing commands to the test platform 320.

At step 803, the test platform 320 interacts with each of a plurality of CPEs 160 (denoted herein as 160-1, 160-2 and so on through 160-N) to perform various tests such as verifying customer QoE at each CPE, verifying CPE operation, retrieving network and/or CPE related performance data (e.g., ever event messages and the like) and so on.

At optional step 802, the central broker 310 propagates relevant testing/data APIs to various internal systems 350 in support of tests to be performed and/or evaluated by the internal systems 350 and/or external assist systems 340. If the external systems 340 are to be used, then at step 804A relevant testing/data APIs are propagated to the external systems 340.

At optional step 804B, the internal systems 350 and/or external assist systems 340 interact with the plurality CPEs 160 to execute appropriate tests and provides such test results to the test platform 320.

At step 806, test results generated by the test platform 320 internal systems 350 and/or external assistance systems 340 are aggregated and provided to the central broker 310.

At step 807, the central broker 310 and internal systems 350 interact with each other to compare aggregated test results with expected results to verify thereby data integrity within the system.

At step 808, the central broker 310 and internal systems 350 interact with each other to verify platform compliance, such as content black out in certain geographic regions and general adherence between the service provider and third-party sources of content and other services. In this manner, a system operator may confirm and prove compliance programmatically at scale across all markets where as required or desired, and do so in a proactive and automated manner.

At step 809, the central broker 310 interacts with various other application monitors 305X to corroborate complementary system health nationally. That is, since various embodiments contemplate a system that is interconnected with other mechanisms for monitoring and/or ensuring QoE and other performance parameters, at step 809 the central broker 310 may interact with such other mechanisms to exchange information. In this manner, where large network including multiple regions or zones of operation, corresponding multiple systems may exchange information such as via the central broker 310 such that the equipment within each of the multiple regions or zones of operation are maintained an appropriate QoE and/or performance level as described herein.

Generally speaking, various embodiments contemplate that the central broker 310 comprises a management entity (e.g., a module within a management system associated with a system operator) central to a plurality of head ends 110, hubs 120 and the like (e.g., within distributed physical remote devices 330). However, in various embodiments the functions described herein with respect to the central broker 310 may be implemented at specific PE such as at a specific head end 110, a specific hub 120 and the like. In these embodiments, the functions associated with the central broker 310 are implemented within a module within or associated with the specific head end 110 or hub 120. That is, the functions implemented by a central broker 310 with respect to CPE associated with many head ends 110 are hubs 120 are instead implemented as a "local broker" with respect to CPE associated with a single head end 110 or hub 120. As previously discussed, such functions include generating/routing remote device control commands, remote device video streams, interacting with CPE valuation mechanisms such as automated test platforms, automated/manual client interaction devices and the like. Thus, various embodiments contemplate that some or all of the head ends 110 and hubs 120 are associated with a respective local broker performing at least a subset of the functions described herein with respect to the central broker 310. Further, various embodiments contemplate that one or more of the respective local brokers are in communication with a central broker 310 such as to aggregate/deliver CPE video/information streams, remote device control commands and the like.

Figure 9:
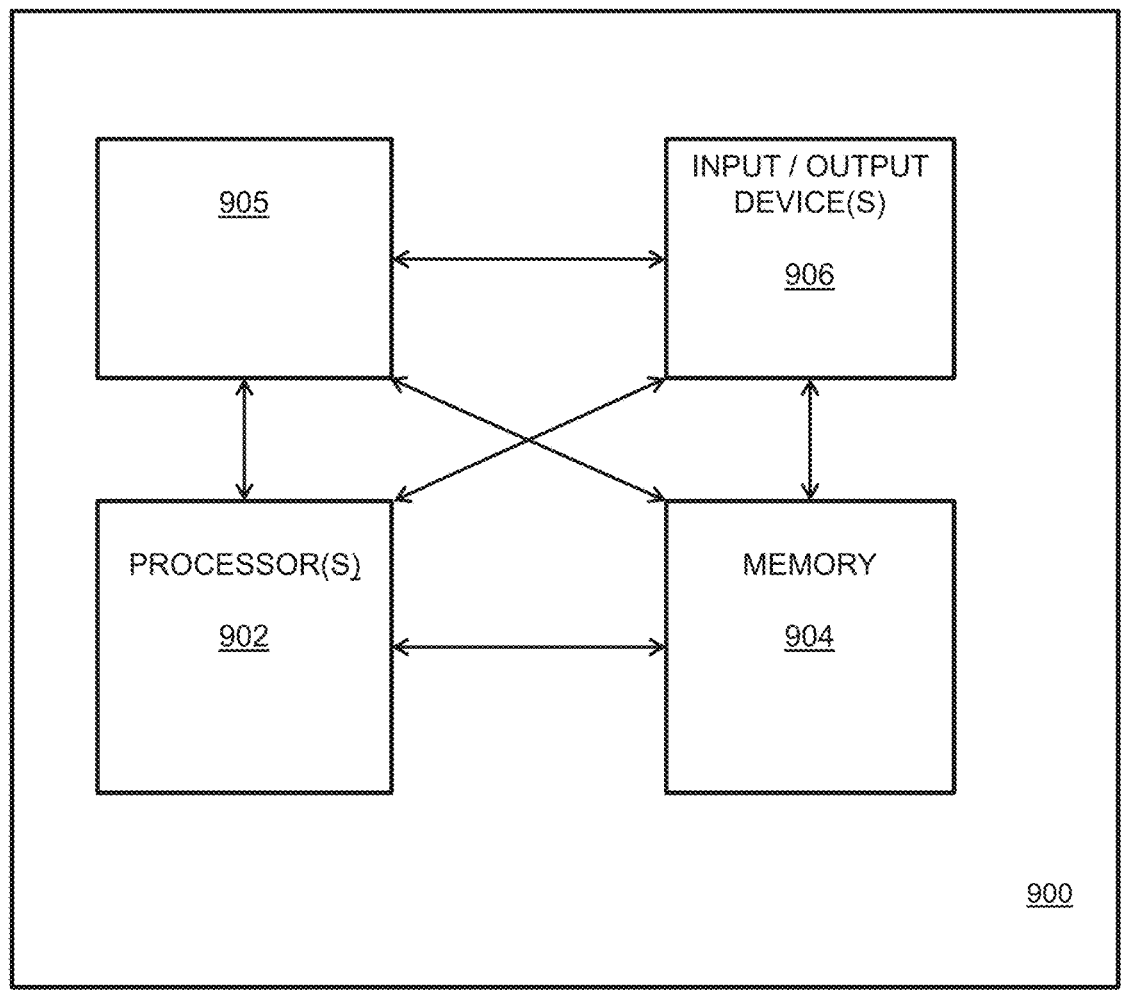
FIG. 9 depicts a high-level block diagram of a computing device suitable for use in performing the functions described herein.

FIG. 9 depicts a high-level block diagram of a computing device, such as for implementing one or more of the provider equipment and customer premises equipment devices described herein, suitable for use in performing functions described herein such as those associated with the various elements described herein with respect to the figures.

In particular, any of the various functional entities described herein, such as head end 110, hub 120, PCP 150, CPE 160, cable modem 210, router 220, STB 230, client system/application for manual and automated access 305, central broker 310, test platform 320, external assistance system 340, internal assist system 350 as well as various other network routing entities, network management entities, server devices, client devices and so on within the system may be implemented in accordance with a general computing device structure such as described herein with respect to FIG. 9.

As depicted in FIG. 9, computing device 900 includes a processor element 903 (e.g., a central processing unit (CPU) or other suitable processor(s)), a memory 904 (e.g., random access memory (RAM), read only memory (ROM), and the like), a cooperating module/process 905, and various input/output devices 906 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 905 can be loaded into memory 904 and executed by processor 903 to implement the functions as discussed herein. Thus, cooperating process 905 (including associated data structures) can be stored on a computer readable storage medium, e.g., RAM memory, magnetic or optical drive or diskette, and the like.

It will be appreciated that computing device 900 depicted in FIG. 9 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Various embodiments described herein advantageously provide a robust, enterprise grade, cloud controlled platform for manual and automated remote testing of the end user experience. The platform can provide these automated tests periodically or in response to analysis of, illustratively, error messages or events, congestion conditions, customer service call trends and so on. Various embodiments integrate with end user testing platforms.

Various embodiments provide automatic testing and discovery of CPE as well as "enhanced" CPE as described herein. Various monies provide a scalable platform for centralized testing and control of distributed user devices at the user experience level across an entire network, one or more hubs, one or more head ends, one or more neighborhoods, one or more groups of CPE and/or individual CPE.

Various embodiments provide a monitoring function wherein all indicia of network error such as network congestion, link or node failure, error reports, events and so on are monitored such that appropriate or focused automatic testing of CPE and other devices related to network error conditions may be preferentially tested.

Various embodiments provide 24/7 automated user experience monitoring across the entire network, one or more hubs, one or more head ends, one or more neighborhoods, one or more groups of CPE on a priority based, scheduled or event driven basis.

Various embodiments provide an ability to remotely reset and check health of STB's and other CPE.

Various embodiments provide auto-discovery of STB and other CPE, as well as retrieval of associated account information via a video stream received from CPE comprising diagnostic stream information, which received video stream is subjected to optical character recognition (OCR) to derive thereby account information normally visible only to the subscriber.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A system, comprising:
a provider equipment (PE) test platform, for receiving and evaluating customer premises equipment (CPE) video streams including respective CPE presentation signal imagery to determine therefrom at least one respective Quality of Experience (QoE) parameter associated with the respective CPE presentation signal imagery; and
a PE central broker, in communication with said test platform and a plurality of CPE, for transmitting remote device control commands (RDCCs) toward said plurality of CPE, each RDCC configured to cause respective CPE to operate in accordance with a desired test and to transmit a corresponding CPE video stream including respective CPE presentation signal imagery.

2. The system of claim 1, wherein said central broker receives said RDCCs from said test platform.

3. The system of claim 1, further comprising:
a synchronization system operatively coupled to said test platform, said broker and said CPE to provide thereby common timing information;
said RDCCs being further configured to cause respective CPE to time stamp at least a portion of said corresponding CPE video stream.

4. The system of claim 1, wherein said CPE comprises a streamer for generating said CPE video stream in response to a set top box (STB) output video signal.

5. The system of claim 4, wherein said CPE comprises a controller for generating control signals in response to said RDCCs, said control signals comprising at least one of an infrared (IR) controller, a Bluetooth controller and a Wi-Fi controller configured to control at least one CPE device.

6. The system of claim 1, further comprising:
a client system, operatively coupled to said broker, for generating said RDCCs in response to input received via a user interface (UI).

7. The system of claim 1, wherein said determined QoE parameter comprises an image quality parameter.

8. The system of claim 1, wherein said RDCCs are generated in response to a trigger condition associated with respective CPE, said trigger condition comprising one of a scheduled test of respective CPE, a determined fault condition of respective CPE, and a determined fault condition of PE associated with respective CPE.

9. The system of claim 1, wherein:
said system determines QoE parameters within a service provider network including provider equipment (PE) and CPE, said QoE parameters being indicative of aggregate QoE levels within the service provider network at one or more of a hub, a head end and a geographic area within the service provider network.

10. A method, comprising:
propagating, from a provider equipment (PE) central broker toward customer premises equipment (CPE), at least one remote device control command (RDCC), each RDCC configured to cause a respective at least one CPE to operate in accordance with a desired test and to transmit a CPE generated video stream toward said central broker;
receiving CPE generated video streams including respective CPE presentation signal imagery; and
propagating received CPE generated video streams toward a test platform configured for evaluating each CPE generated video stream to determine therefrom at least one quality of experience (QoE) parameter of the respective CPE.

11. The method of claim 10, wherein said method is performed for each of a plurality of CPE associated with one of a hub, a head end and a geographic region within a service provider network.

12. The method of claim 10, wherein said determined QoE parameter comprises a set top box (STB) output video quality parameter.

13. The method of claim 10, wherein said determined QoE parameter comprises a set top box (STB) performance parameter.

14. The method of claim 10, further comprising receiving, at said central broker, at least one RDCC generated by a client system in response to a user interaction therewith.

15. The method of claim 10, further comprising receiving, at said central broker, at least one RDCC generated by an automated test platform in response to a trigger condition associated with respective CPE, said trigger condition comprising one of a scheduled test of respective CPE, a determined fault condition of respective CPE, and a determined fault condition of PE associated with respective CPE.

16. The method of claim 10, further comprising initiating a corrective action in response to an indication of CPE performance degradation, said corrective action comprising at least one of generating an alarm, generating a warning and generating a repair ticket.

17. A method of monitoring Quality of Experience (QoE) of a device under test (DUT), the device under test configured to generate an image-bearing presentation signal for use by a presentation device, the method comprising:
    converting the presentation signal into a data stream configured to enable QoS processing of the presentation imagery by a QoS assessment device; and
    forwarding the data stream toward a remote QoE assessment device.

18. The method of claim 17, wherein said DUT is configured to deliver said image-bearing presentation signal in accordance with a content protection protocol, said method further comprising:
    stripping content protection from said image-bearing presentation signal.

19. The method of claim 18, where said image-bearing presentation signal comprises a High-Definition Multimedia Interface (HDMI) signal and said content protection protocol comprises a High-Bandwidth Digital Content Protection (HDCP) protocol.

20. The method of claim 18, further comprising delivering to said DUT a control signal configured to cause said DUT to generate an image-bearing presentation signal associated with a selected test.

21. A tangible and non-transient computer readable storage medium storing instructions which, when executed by a computer, adapt the operation of the computer to perform a method of determining a Quality of Experience (QoE) parameter at a remote device, the method comprising:
    propagating, from a provider equipment (PE) central broker toward customer premises equipment (CPE), at least one remote device control command (RDCC), each RDCC configured to cause a respective at least one CPE to operate in accordance with a desired test and to transmit a CPE generated video stream toward said central broker;
    receiving CPE generated video streams including respective CPE presentation signal imagery; and
    propagating received CPE generated video streams toward a test platform configured for evaluating each CPE generated video stream to determine therefrom at least one quality of experience (QoE) parameter of the respective CPE.

22. A computer program product comprising a non-transitory computer readable medium storing instructions for causing a processor to implement a method of determining a Quality of Experience (QoE) parameter at a remote device, the method comprising:
    propagating, from a provider equipment (PE) central broker toward customer premises equipment (CPE), at least one remote device control command (RDCC), each RDCC configured to cause a respective at least one CPE to operate in accordance with a desired test and to transmit a CPE generated video stream toward said central broker;
    receiving CPE generated video streams including respective CPE presentation signal imagery; and
    propagating received CPE generated video streams toward a test platform configured for evaluating each CPE generated video stream to determine therefrom at least one quality of experience (QoE) parameter of the respective CPE.

* * * * *